United States Patent
Kitamura et al.

(10) Patent No.: US 7,209,993 B2
(45) Date of Patent: Apr. 24, 2007

(54) APPARATUS AND METHOD FOR INTERRUPT CONTROL

(75) Inventors: Akira Kitamura, Takatsuki (JP); Noboru Asai, Takatsuki (JP); Koichi Yasutake, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 160 days.

(21) Appl. No.: 10/995,175

(22) Filed: Nov. 24, 2004

(65) Prior Publication Data

US 2005/0144347 A1 Jun. 30, 2005

(30) Foreign Application Priority Data

Dec. 25, 2003 (JP) .............................. 2003-431252

(51) Int. Cl.
*G06F 13/24* (2006.01)

(52) U.S. Cl. ..................... 710/260; 710/261; 710/264; 710/266; 710/268; 710/269

(58) Field of Classification Search ................ 710/260, 710/262, 263, 264, 266, 268, 269; 711/206, 711/207

See application file for complete search history.

(56) References Cited

U.S. PATENT DOCUMENTS

| | | | | |
|---|---|---|---|---|
| 5,640,533 A | * | 6/1997 | Hays et al. ................. | 711/133 |
| 5,768,599 A | * | 6/1998 | Yokomizo .................... | 710/260 |
| 5,875,341 A | | 2/1999 | Blank et al. | |
| 6,038,661 A | * | 3/2000 | Yoshioka et al. ............ | 712/244 |
| 6,112,273 A | * | 8/2000 | Kau et al. .................... | 710/260 |
| 6,425,038 B1 | | 7/2002 | Sprecher | |
| 6,539,447 B1 | * | 3/2003 | Sawada ....................... | 710/260 |
| 6,968,412 B1 | * | 11/2005 | Nalawadi .................... | 710/261 |

FOREIGN PATENT DOCUMENTS

JP 2001-216172 8/2001

OTHER PUBLICATIONS

Definition of Interrupt from Wikipedia.*
Definition of Interrupt Descriptor Table from Wikipedia.*
Definition of Interrupt Vector Table from Wikipedia.*

* cited by examiner

*Primary Examiner*—Khanh Dang
(74) *Attorney, Agent, or Firm*—Wenderoth, Lind & Ponack, L.L.P.

(57) ABSTRACT

An interrupt control apparatus comprising an interrupt vector register for holding address information corresponding to interrupt resources of a first type which are managed by an operating system and interrupt resources of a second type which are not managed by the operating system. Regarding an interrupt generated by an interrupt resource of the first type, the interrupt control apparatus in the present invention launches a common interrupt entry function which is subject to a scheduling process common to the interrupt resources of the first type, based on the address information of the interrupt vector register. At the same time, with regard to an interrupt generated by an interrupt resource of the second type, the interrupt control apparatus in the present invention launches an extended interrupt entry function which is not subject to the aforementioned scheduling process, based on the address information held in the interrupt vector register.

21 Claims, 12 Drawing Sheets

FIG. 9

| Interrupt level | Interrupt entry function |
|---|---|
| 0 | Common interrupt entry |
| ... | Common interrupt entry |
| i | Common interrupt entry |
| i+1 | Extended interrupt entry |
| ... | Extended interrupt entry |
| j | Extended interrupt entry |
| j+1 | Common interrupt entry |
| ... | Common interrupt entry |
| k | Common interrupt entry |

103b

APPARATUS AND METHOD FOR INTERRUPT CONTROL

BACKGROUND OF THE INVENTION (1) Field of the Invention

The present invention relates to an interrupt control apparatus for controlling interrupts generated from interrupt resources, as a part of an OS (Operating System) for controlling a computer system.

(2) Description of the Related Art

Generally, the interrupt control in a computer system processes interrupts from each of the interrupt resources by unified management in the OS.

FIG. 1 is a diagram showing the relation of the transition from the kernel space to the user process space of the OS when an interrupt is generated, in the existing computer system. As shown in the diagram, an interrupt transitions to a user process within a process space 601, from an interrupt processing unit for receiving interrupts and after schedule processing by the scheduler, in a kernel space 602.

FIG. 2 is a diagram showing the structure of the interrupt control apparatus in the existing computer system. The diagram includes peripheral devices as interrupt resources generating interrupts, an interrupt controller, a CPU, an OS, and an application process, shown in a hierarchical manner. FIG. 3 is an operation explanatory diagram showing the process flow in FIG. 2 by focusing on the register structure of each component element. The operations in FIG. 2 shall be explained more specifically, using FIG. 3.

An interrupt controller (INTC) 502 detects the generation of an interrupt from a variety of peripheral devices (I/O apparatus) 501*a*, 501*b*, and the like, and sets a flag of a cause number within the cause number register 502*a*, corresponding to the interrupt cause concerned. If such interrupt cause is not masked by software settings, the interrupt controller 502 notifies a CPU 503 of the interrupt generation.

The CPU 503 possesses interrupt vector registers 503*a* complying with interrupt levels. After receiving the interrupt notification from the interrupt controller 502, the CPU 503 reads an interrupt vector from the interrupt vector register to which the interrupt cause is assigned, and executes an interrupt entry function 505 managed by the OS. By executing such entry function 505, determination of the interrupt cause, transition to a user interrupt handler, and so on is carried out. At that time, a scheduler 506 carries out schedule adjustment among other interrupts and other processes. After schedule adjustment, the scheduler 506 launches the interrupt handler 507*a*, 507*b*, or the like corresponding to the interrupt cause, and the process corresponding to the interrupt request is carried out (or the corresponding process is called).

It is common in the existing interrupt control apparatus to carry out the series of interrupt control through the operation mentioned above.

Incidentally, the usual OS does not assume the case in which only specific interrupt resources are considered as being outside the management of the OS, and a particular mechanism is required for such. As a particular mechanism for such purpose, an implementation method using a plurality of OSs and an OS-independent interrupt management program is disclosed in official publication of Japanese Laid-Open Patent Application No. 2001-216172 (hereinafter referred to as Reference 1).

Reference 1 discloses a method for interrupt control using a method in which the interrupt resources managed by one of OSs is taken by the OS-independent interrupt management program and distributed to the other OSs, and a method in which the launch timing of respective interrupt handlers is determined according to the execution status of the OSs. According to this method for interrupt control, a generated external interrupt is processed once through the interrupt management program, and it is possible to distribute the interrupt processing among the plurality of OSs and carry out such interrupt processing in the distribution destination OS. Furthermore, even in the case where the interrupt processing is multiplexed among the plurality of OSs, exclusive control is possible by managing the interrupt status through the interrupt management program.

However, according to the existing interrupt control apparatus, in the case where only a particular interrupt resource is considered as being outside the management of the OS, the problem exists in which responsiveness, from the generation of the interrupt to the execution of the corresponding application, in other words, real-timeliness, cannot be guaranteed.

Specifically, the problems mentioned below exist in the case where specific interrupt resources for an OS are separated and managed independently by another program.

(1) In Reference 1, interrupt status management becomes a necessity for the interrupt management program as the interrupt management program reconciles the multiplexing among the OSs carrying out interrupt processing. For example, in Reference 1, the scheduler 506 would be equivalent to an interrupt management program which carries out more complicated schedule adjustments. In processing through a new implementation of such interrupt management program, a degree of real-timeliness is lost with the additional requirement of managing the interrupt status, in addition to the interrupt entry function implemented in the existing OS.

(2) Regardless of Reference 1, conventionally, there is no mechanism that positions an interrupt handler function of a user, corresponding to a particular interrupt cause, in a user process space instead of the address space (kernel space) of the OS, and carries out the transition to such positioned interrupt handler function without inhibiting interrupt responsiveness. In the process of transition from the kernel space 602 to the process space 601 shown in FIG. 1, the responsiveness of the scheduler is dependent on the performance of the OS. In a multi-purpose OS, there is no guarantee for the time taken up to the transition to the application, after an interrupt is generated. In other words, the absence of a guarantee for real-timeliness becomes an issue.

(3) The structure in Reference 1 is one which requires at least two or more OSs, as the interrupt resources for the CPU are divided for management by a plurality of OSs, and the case where interrupt resources are divided between one OS and the application program running on such OS is not assumed.

In consideration of the aforementioned issues, the present invention has as an objective, to provide in a multi-purpose OS, an interrupt control apparatus for interrupts from interrupt resources, which guarantees real-timeliness, a control method as well as a program thereof. In particular, the present invention has as an objective to provide an interrupt control apparatus for guaranteeing and realizing on a multi-purpose OS, real-timeliness commonly required in built-in devices, a control method as well as a program thereof.

SUMMARY OF THE INVENTION

In order to resolve the aforementioned issues, the interrupt control apparatus of the present invention is an interrupt control apparatus for controlling interrupts generated from interrupt resources, as a part of an operating system controlling a computer system, comprising a table unit operable to hold address information corresponding respectively to interrupt resources of first type which are managed by the operating system and interrupt resources of second type which are not managed by the operating system, among the interrupt resources, and a launching unit operable to launch, based on the address information held in the table unit, i) a first control process which includes a management process common to the interrupt resources of first type, for an interrupt generated by an interrupt resource of first type, and ii) a second control process which does not include said management process, for an interrupt generated by an interrupt resource of second type.

According to this structure, it is possible to launch an interrupt process with lower real-timeliness but having superior versatility for the first type interrupt resource, and launch an interrupt process with superior real-timeliness that responds rapidly to an interrupt for the second type interrupt resource.

Here, it is possible to have a structure where the interrupt control apparatus further comprises a receiving unit operable to receive a notification indicating a specific interrupt resource and address information, the notification resulting from an execution of an application program, wherein the table unit holds the address information corresponding to the second type of interrupt resource according to the notification received by the receiving unit.

According to this structure, it is possible for the application to freely change the setting of an arbitrary interrupt resource requiring real-timeliness, from a first type to a second type.

Here, it is possible to have a structure where, in the second control process, the launching unit sequentially executes a saving of a context, an interrupt process for the second type of interrupt resource which generated the interrupt, and a restoration of the saved context.

Here, it is possible to have a structure where, in the second control process, the launching unit prohibits interrupt inputs prior to the execution of the context saving, and cancels said prohibition of interrupt inputs by the time the second control process is completed.

According to this structure, real-timeliness can be assured even more certainly as the inputs of other interrupts are prohibited until the conclusion of the process requiring real-timeliness in the interrupt process corresponding to a second type interrupt resource.

Here, it is possible to have a structure where the interrupt control apparatus further comprises a conversion buffer operable to cache page data corresponding to a process which is currently being executed, from a page table for virtual memory, and an updating unit operable to update the conversion buffer prior to the execution of the interrupt process so as to hold page data corresponding to said interrupt process, in the second control process.

Here, it is possible to have a structure where the receiving unit further receives a notification indicating a process ID of the interrupt process corresponding to the second type of interrupt resource, the notification resulting from the execution of the application program, and the updating unit reads the page data from the page table according to a process ID indicated in the notification received by the receiving unit, and stores said page data in the conversion buffer.

According to this structure, it is possible to place an interrupt process in a process space easily as the conversion buffer, referred to as a TLB (Translation Look-aside Buffer), where the virtual memory is updated.

Here, it is possible to have a structure where the table unit further holds, for each interrupt resource, an interrupt level, and a classification indicating whether the interrupt is of the first type or the second type, and the launching unit determines the interrupt level and whether a generated interrupt is of the first type or the second type based on the classification held in the table unit.

Here, it is possible to have a structure where the launching unit determines whether a generated interrupt is of the first type or the second type by comparing an interrupt level of said interrupt with a predetermined level.

According to this structure, it is possible to change the arbitrary interrupt level from a first type to a second type, or alternatively, it is possible to set as a second type, an interrupt resource having an interrupt level which is lower (or higher) than a predetermined level.

As explained above, according to the interrupt control in the present invention, it is possible to have both an interrupt process with lower real-timeliness but having superior versatility, and an interrupt process with superior real-timeliness that responds rapidly to an interrupt. Furthermore, in an arbitrary interrupt level specified by the application, the implementation of the control method as an interrupt process that is unique to the user, is launched without going through the second type of OS management process.

Furthermore, with regard to the exclusive control of the interrupt processes between the second type interrupt resources managed by the application and the first type interrupt resources managed in the OS, there is no need to have a separate adjustment mechanism, and as processing delays resulting from an adjustment mechanism itself do not occur, exclusive control is possible without inhibiting responsiveness.

In addition, it is possible to implement the interrupt process function managed by the application, in the user process space of the application, which is a different space from the kernel space. Real-timeliness for the interrupt process corresponding to the second type of interrupt resource, in other words transition to the interrupt process function (user process space), can be guaranteed.

Furthermore, the interrupt control method and program in the present invention also possess the same means, operations and effects as those mentioned above.

FURTHER INFORMATION ABOUT TECHNICAL BACKGROUND TO THIS APPLICATION

The disclosure of Japanese Patent Application No. 2003-431252 filed on Dec. 25, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the Drawings:

FIG. 9 is a diagram showing an example of the management table for showing correspondence to either a first type or a second type, for each interrupt level.

DESCRIPTION OF THE PREFERRED EMBODIMENT(S)

First Embodiment

The embodiments of the interrupt control method of the present invention shall be explained with reference to the diagrams.

(Structure of the Interrupt Control Apparatus)

Figure 1:
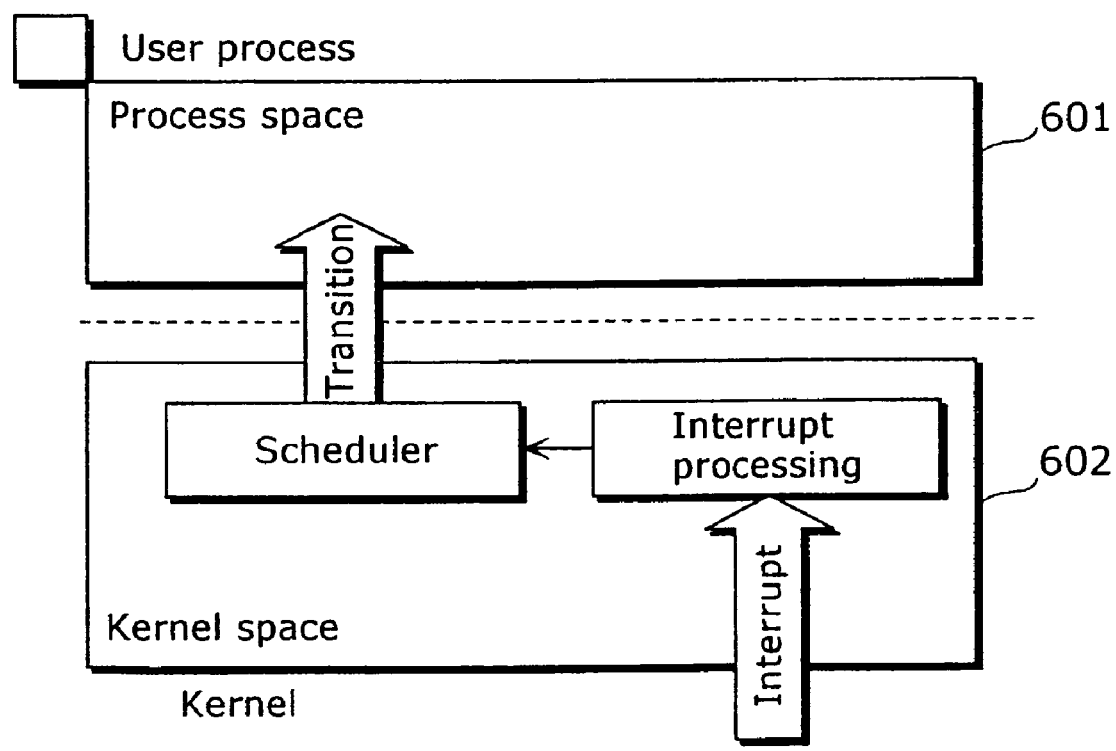
FIG. 1 is a diagram showing the relation of the transition of interrupt control from the kernel space to the user process space of the existing OS.
Figure 2:
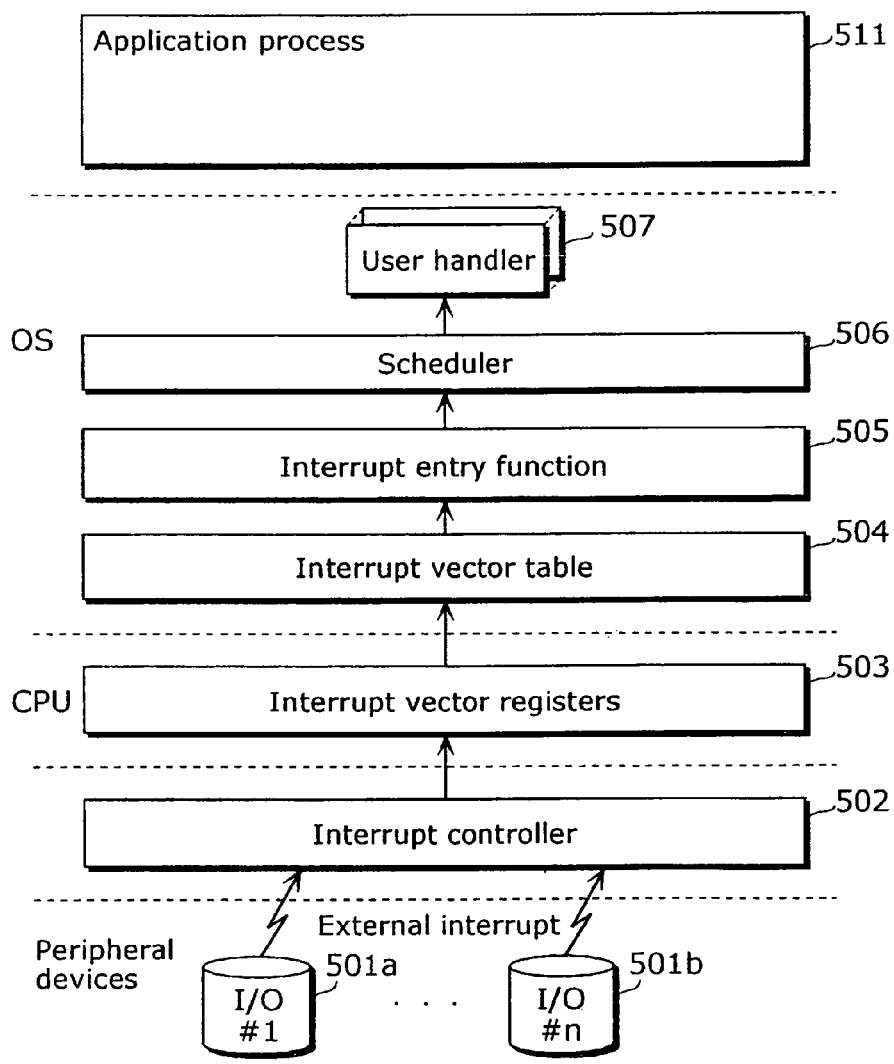
FIG. 2 is a diagram showing the structure of the interrupt control apparatus in the existing computer system.
Figure 3:
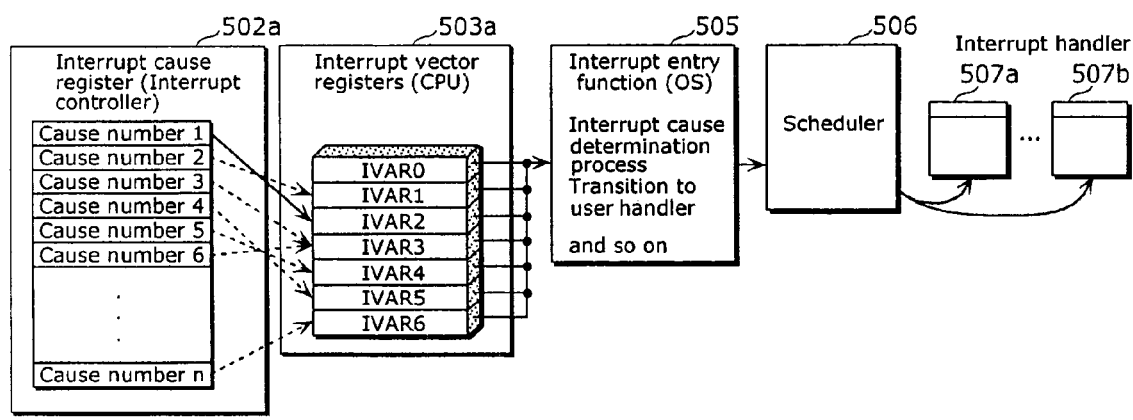
FIG. 3 is an operation explanatory diagram showing the process flow in FIG. 2 by focusing on the register structure of each component element.
Figure 4:
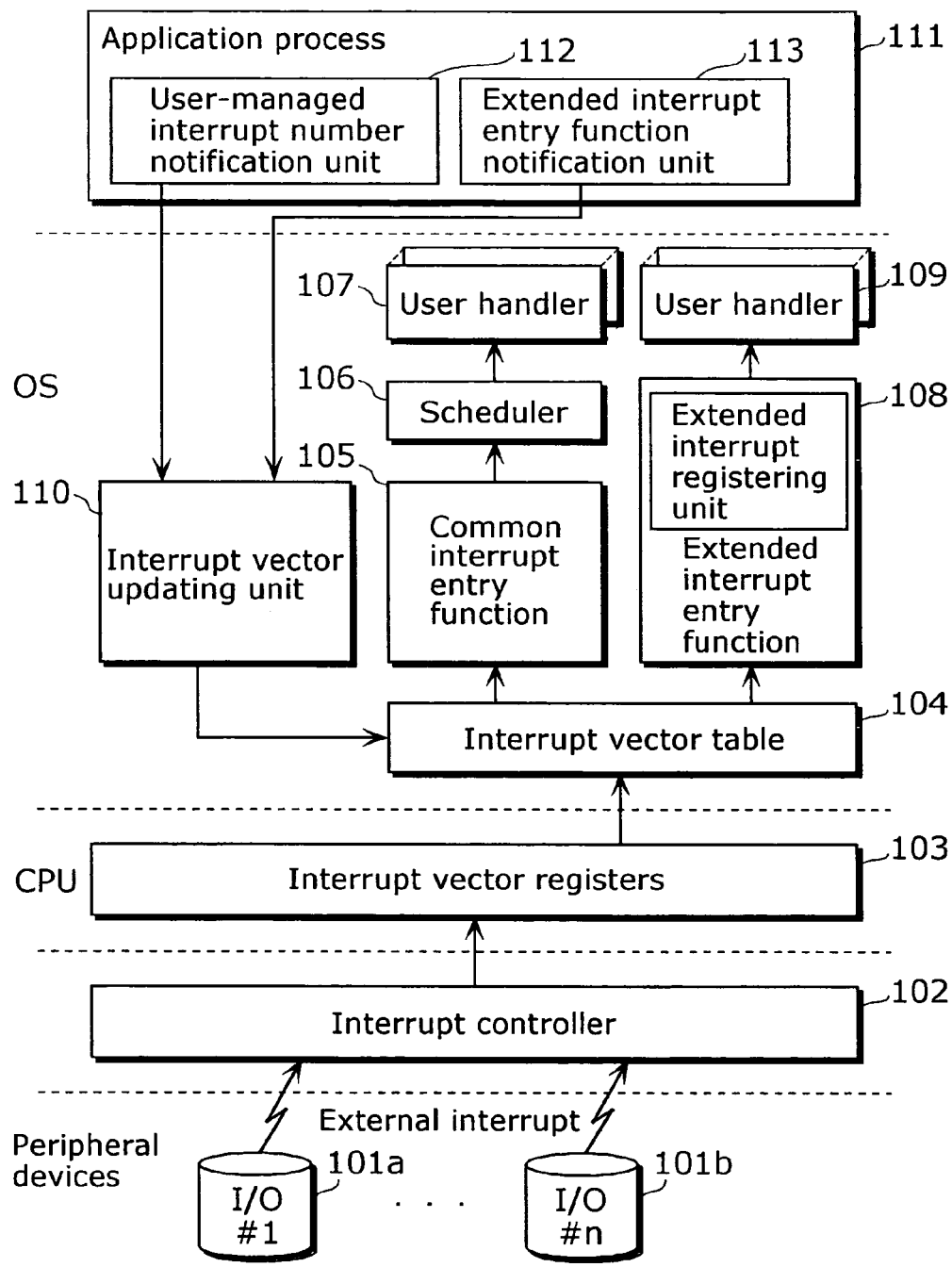
FIG. 4 is a block diagram showing the structure of the interrupt control apparatus in the first embodiment.

FIG. 4 is a block diagram showing the system structure of the interrupt control apparatus in the first embodiment of the present invention. The diagram shows in a hierarchical manner, an application, an OS, a CPU, an interrupt controller, and external devices. The difference with that of the existing system structure shown in FIG. 2 is the inclusion of a user-managed interrupt number notification unit 112, an extended interrupt entry function notification unit 113, and an interrupt vector updating unit 110. The user management interrupt number notification unit 112 is a mechanism for notifying the OS, through an own-process which is a process corresponding to the application, of the interrupt level that the application desires to be managed by the user, in other words, the interrupt level to be assumed as being outside the management of the OS. The extended interrupt entry function notification unit 113 is a mechanism for notifying the function address referred to as an extended entry function 108 which is provided by the application. The interrupt vector updating unit 110 receives the notification of the address of the extended interrupt entry function provided by such application, within the OS. The extended interrupt entry function 108 and a user handler 109 are provided as applications, and not as a part of the OS.

Figure 5:
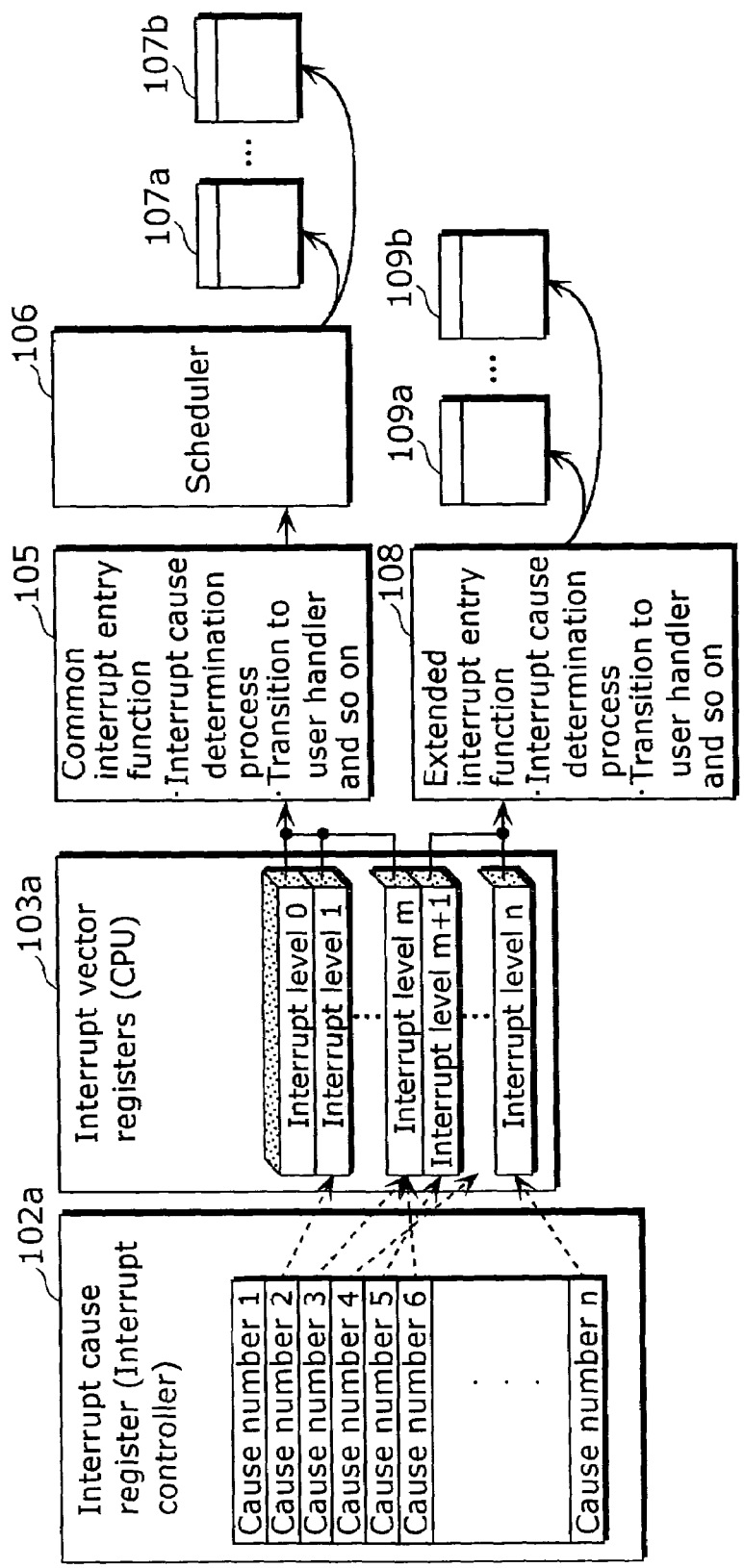
FIG. 5 is an operation explanatory diagram showing the process flow by focusing on the register structure.

Specific explanation shall be made regarding the interrupt control apparatus shown in FIG. 4, using FIG. 5 which shows the process flow, focusing on the register structure of each component element.

The interrupt controller 102 detects the interrupt generation from various peripheral devices (I/O apparatuses) 101a, 101b, and so on, and sets the flag of the cause number within the cause number register 102a, corresponding to the interrupt cause concerned. If such interrupt cause is not masked by software settings, the interrupt controller 102 notifies a CPU 103 of the interrupt generation.

The CPU 103 includes interrupt vector registers 103a complying with the interrupt levels. The interrupt vector registers 103a include interrupt level registers for holding addresses corresponding to interrupt levels from level 0 to level n in the order of highest priority.

In the example in FIG. 5, the interrupt level registers from level 0 to level m in the interrupt vector registers 103a are for first type interrupt use, with each holding the starting address of a common interrupt entry function 105. Furthermore, the interrupt level registers from level m+1 to level n are for second type interrupt use, with each holding the starting address of the extended interrupt entry function 108. Here, the first type of interrupt refers to a versatile interrupt for which interrupt processing (interrupt handler 107a, 107b, and so on, of the user) is launched via a common management process (mainly the scheduling process of a scheduler 106) in the OS, in the same manner as in existing technology. The second type of interrupt refers to an interrupt managed by the application for which interrupt processing (interrupt handler 109a, 109b, and so on) is launched without going through the aforementioned management process, and for which real-timeliness is guaranteed.

After the interrupt notification from the interrupt controller 102 is received, either the common interrupt entry function 105 or the extended interrupt entry function 108 is called depending on the address of the interrupt vector register to which the interrupt cause is assigned. In the example in the diagram, in the case of a first type interrupt, the common interrupt entry function 105 is called, and in the case of a second type interrupt, the extended interrupt entry function 108 is called.

With the execution of the common interrupt entry function 105, determination of the interrupt cause, transition to the user's interrupt handler 107a, 107b or the like, and so on, is carried out. At that time, the scheduler 106 performs multiplex reconciliation among other interrupts and schedule adjustment among other processes. After adjustments, the scheduler 106 launches the interrupt handler 107a, 107b, or the like corresponding to the interrupt cause. Through the calling of the interrupt handler 107a, 107b, or the like, the interrupt process corresponding to the interrupt request is carried out (or called).

At the same time, with the execution of the extended interrupt entry function 108, determination of the interrupt cause, transition to the user's interrupt handler 107a, 107b or the like, and so on, is carried out. At that time, the interrupt handler 109a, 109b, or the like, corresponding to the interrupt cause is launched without delay as the adjustments by the scheduler 106 are not undertaken. Through the calling of the interrupt handler 109a, 109b, or the like, the interrupt process corresponding to the interrupt request is carried out (or called).

(Registration Process by the Application)

Figure 6:
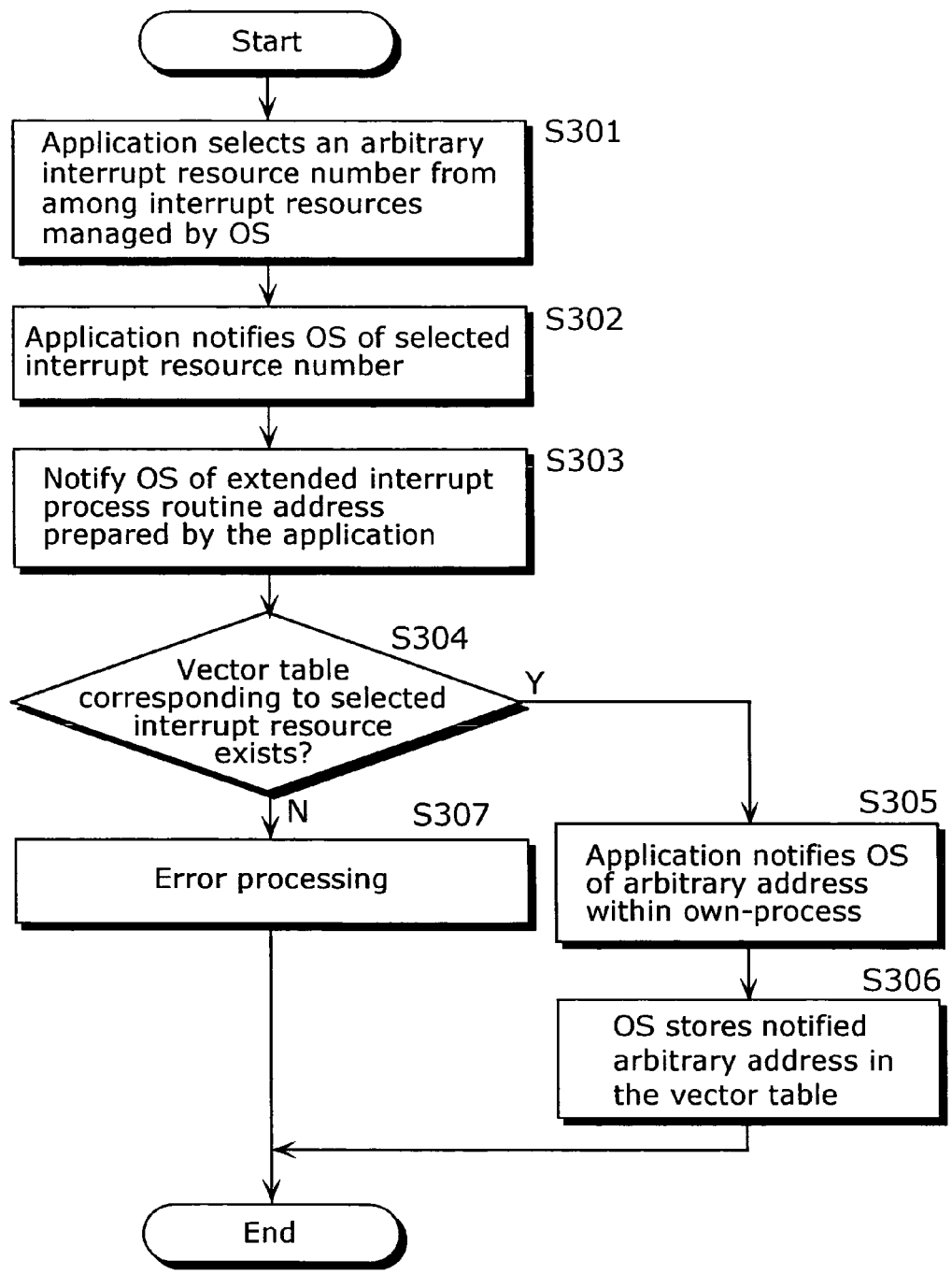
FIG. 6 is a flowchart showing the process for storing the extended interrupt entry function.

FIG. 6 is a flowchart showing the process of registering the address of the interrupt processing routine provided by the user application (in other words, the extended interrupt entry function 108) into the interrupt vector register within the CPU. The procedures in the diagram are executed, for example, at the beginning of the launching of the application, in the case where an arbitrary interrupt request necessitating real-timeliness is set as a second type interrupt.

First, the application currently being executed (hereinafter referred to simply as "application") selects the resource number of the arbitrary interrupt resource requiring real-timeliness, from among the interrupt resources managed by the OS (S301). In the example in FIG. 5, the interrupt cause (peripheral device name or number) as well as the interrupt level, are selected as interrupt resources. In this case, if interrupt causes and interrupt levels are in a one-to-one or many-to-one correspondence, the resource number to be selected need only be the interrupt level. The application then notifies the OS of the selected interrupt resource number (S302). Next, the OS is notified of the name (or starting address) of the extended interrupt entry function for storing the address in the interrupt vector table corresponding to such selected interrupt level (S303).

Having received the notification, the interrupt updating unit 110 within the OS determines whether or not a vector register corresponding to the notified resource number is present in the vector table (S304). In the case where such vector register is present, the application further notifies the OS of the starting address of the extended interrupt entry function (an arbitrary address within the own-process is also acceptable) (S305). The interrupt updating unit 110 within the OS stores the notified address in a vector register within the vector table (S306), and the process is concluded. If the vector register corresponding to the resource number notified by the application is not present in the vector table, in the aforementioned step S304, error processing is carried out (S307), and the process is concluded.

In this manner, the address of the extended interrupt entry function for the interrupt resource arbitrarily selected by the application is stored in the vector table.

(Interrupt Control Process)

Figure 7:
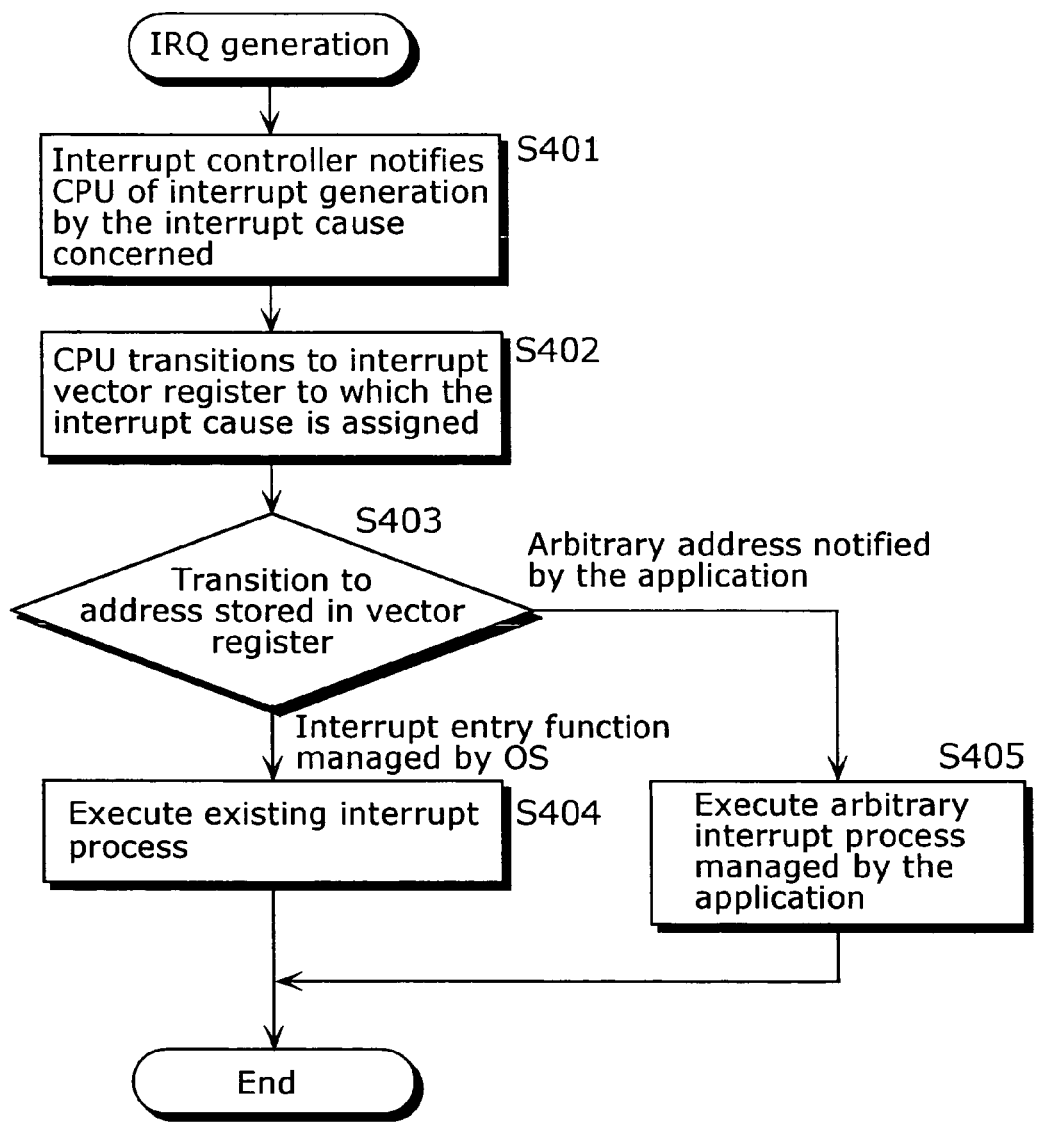
FIG. 7 is a flowchart showing the interrupt control process.

FIG. 7 is a flowchart showing the interrupt control process in the case where an interrupt is actually generated, after the storing process in FIG. 6.

In the case where an interrupt is generated from an interrupt resource such as a peripheral I/O device, the interrupt controller 102 managing such interrupt notifies the CPU of the interrupt generation by the interrupt cause concerned (S401). The CPU transitions to the interrupt vector register to which such interrupt cause is assigned (S402). An interrupt vector register within the CPU, which complies with the notified interrupt cause, is selected (S403).

In the case where the transition destination interrupt vector register is the address of the extended interrupt entry function 108 stored in FIG. 6, such extended interrupt entry function 108 is executed (S405). If it is a different interrupt vector register, the existing common interrupt entry function 105 of the OS is executed (S404).

As a result, as shown in FIG. 5, an interrupt process unique to the application and with superior real-timeliness becomes possible as the address of the extended interrupt entry function 108 provided by the application also exists, aside from the address of the existing common interrupt entry function 105 managed by the OS, as the address of the interrupt entry function stored within the interrupt vector register. In the example in FIG. 5, in the case where the interrupt level is higher than the level m, the extended interrupt entry function 108 is launched as a second type interrupt.

In the above manner, the interrupt control apparatus is able to launch, for a second type interrupt, an interrupt process with superior responsiveness which is unique to the user function, without going through the management process within the OS for the arbitrary interrupt level.

Figure 8:
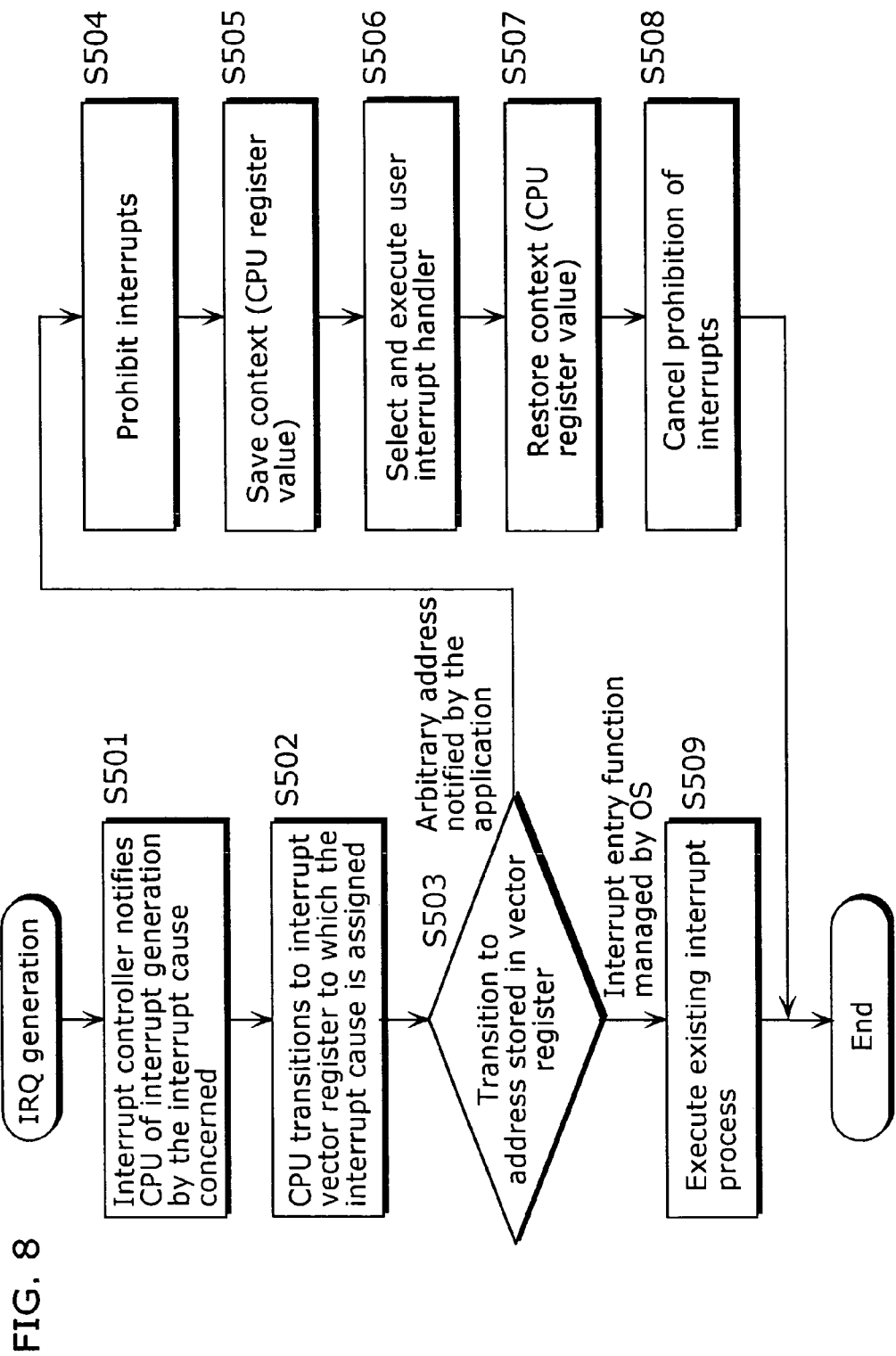
FIG. 8 is a flowchart showing another interrupt control process.

In addition, in place of the interrupt control shown in FIG. 7, the interrupt control process shown in FIG. 8 can also be executed. FIG. 8 is different in comparison to FIG. 7 in executing steps S504 to S508 in place of the step S405. As steps S501, S502, S503 and S509 in FIG. 8 are respectively equivalent to steps S401 to S404 in FIG. 7, explanation for these shall be omitted, with focus being given to the points of difference.

The processes in S504 to S508 indicate the interrupt process by an extended interrupt entry function called as a result of a second type interrupt, or the interrupt process called through the extended interrupt entry function.

Initially, inputs of other interrupt processes are first prohibited (S504) with the launching of the extended interrupt entry function. By changing the setting of the mask register of the interrupt controller 102, such prohibition needs only to be for all or a part of maskable interrupts. Next, the context (data, and so on, of the various control registers of the CPU) of the process currently being executed is saved (S505), and the interrupt handler 109a, or the like, of the user, corresponding to the resource which generated the interrupt is selected and executed (S506). After the execution of the interrupt handler of the user, the saved context is restored (S507), and the interrupt input prohibition is cancelled (S508).

According to this input control process, the input process can be executed more reliably as other interrupt inputs are prohibited. As a result, real-timeliness can be more reliably guaranteed. Moreover, input prohibition and the cancellation thereof can be carried out in line with the real-timeliness required in the interrupt process. For example, when the real time processing is concluded after the prohibition in S504, cancellation of the prohibition can be done.

In this manner, exclusive control for second type interrupts managed by the application and first type interrupts managed by the OS becomes possible. In the example in FIG. 5, the reconciliation, per se, of the multiplex between first and second type interrupts is implemented by the CPU without going through the OS, as the first type and second type are split according to the interrupt level. For this reason, there is no need to have a separate structure for reconciling the first and second type interrupts, and no delay occurs in the shifting to the second type of interrupt process.

Furthermore, although an example is shown in FIG. 5 wherein the generated interrupt is classified as either a first type or a second type depending on whether its level is higher or lower than the level m, it is also possible to have a structure in which the first type and the second type is set individually for the interrupt levels. FIG. 9 shows, for such a case, an example of a management table where each interrupt level is arbitrarily set to correspond to either the first type or the second type.

Furthermore, in FIG. 9 and FIG. 5, it is also possible to have the respective interrupt entry functions stored in advance, without the storing procedures shown in FIG. 6.

Second Embodiment

Figure 10:
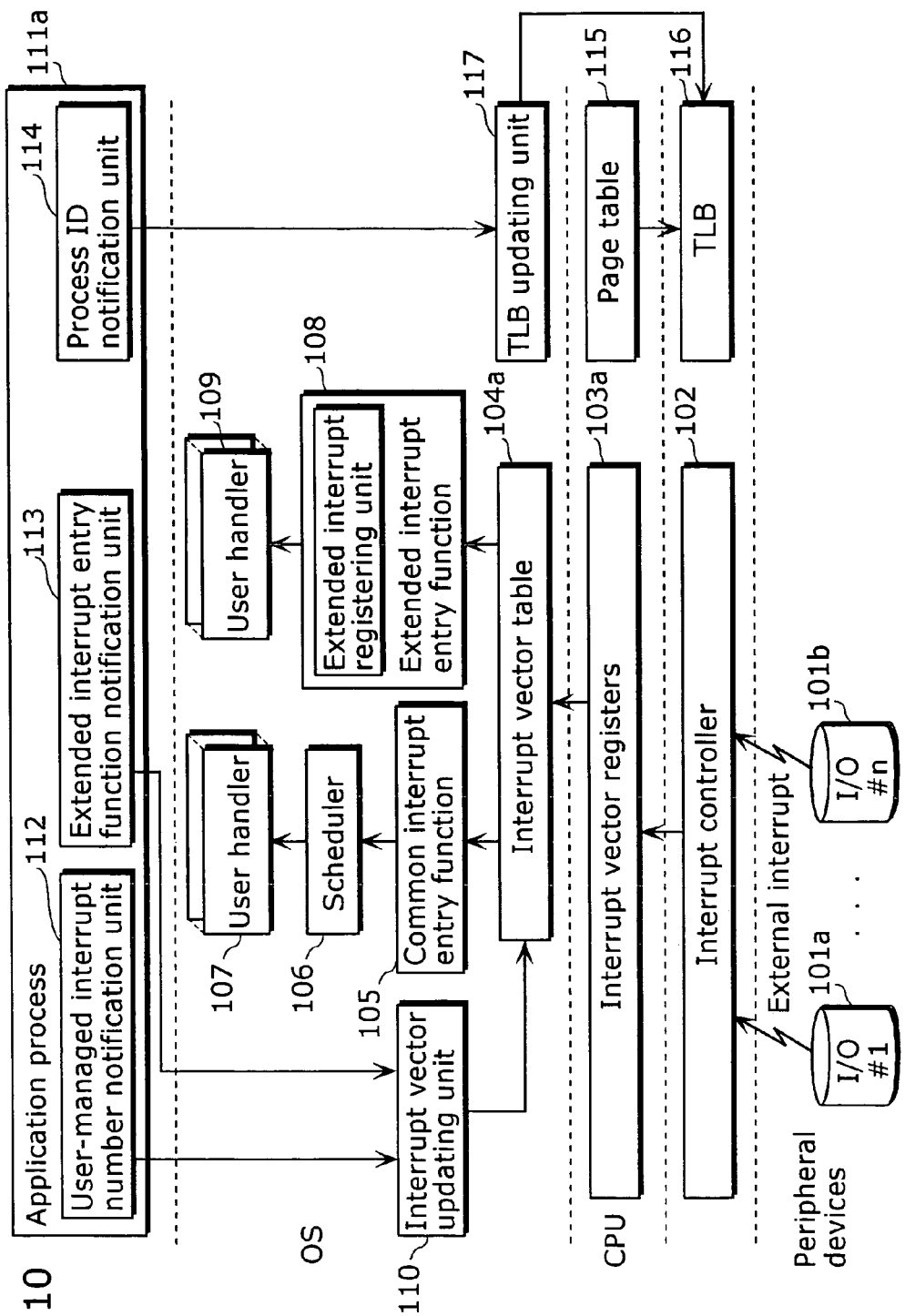
FIG. 10 is a block diagram showing the structure of the interrupt control apparatus in the second embodiment.

FIG. 10 is a block diagram showing the system structure of the interrupt control apparatus in the second embodiment of the present invention. In comparison with the system structure in FIG. 4, the system structure in the diagram is mainly different in including a process ID notification unit 114 and a TLB updating unit 117. The process ID notification unit 114 is used by the application to notify the OS of the application's own-process ID. The TLB updating unit 117 within the OS updates the TLB (Translation Look-aside Buffer) of the CPU based on the ID notified by the application. Furthermore, the same diagram also notes that a page table 115 which is a correspondence chart between a virtual address for a virtual memory and a physical address, and a TLB 116 which temporarily caches, from the page table 115, page data corresponding to a process currently being executed, are included within the CPU.

Figure 11:
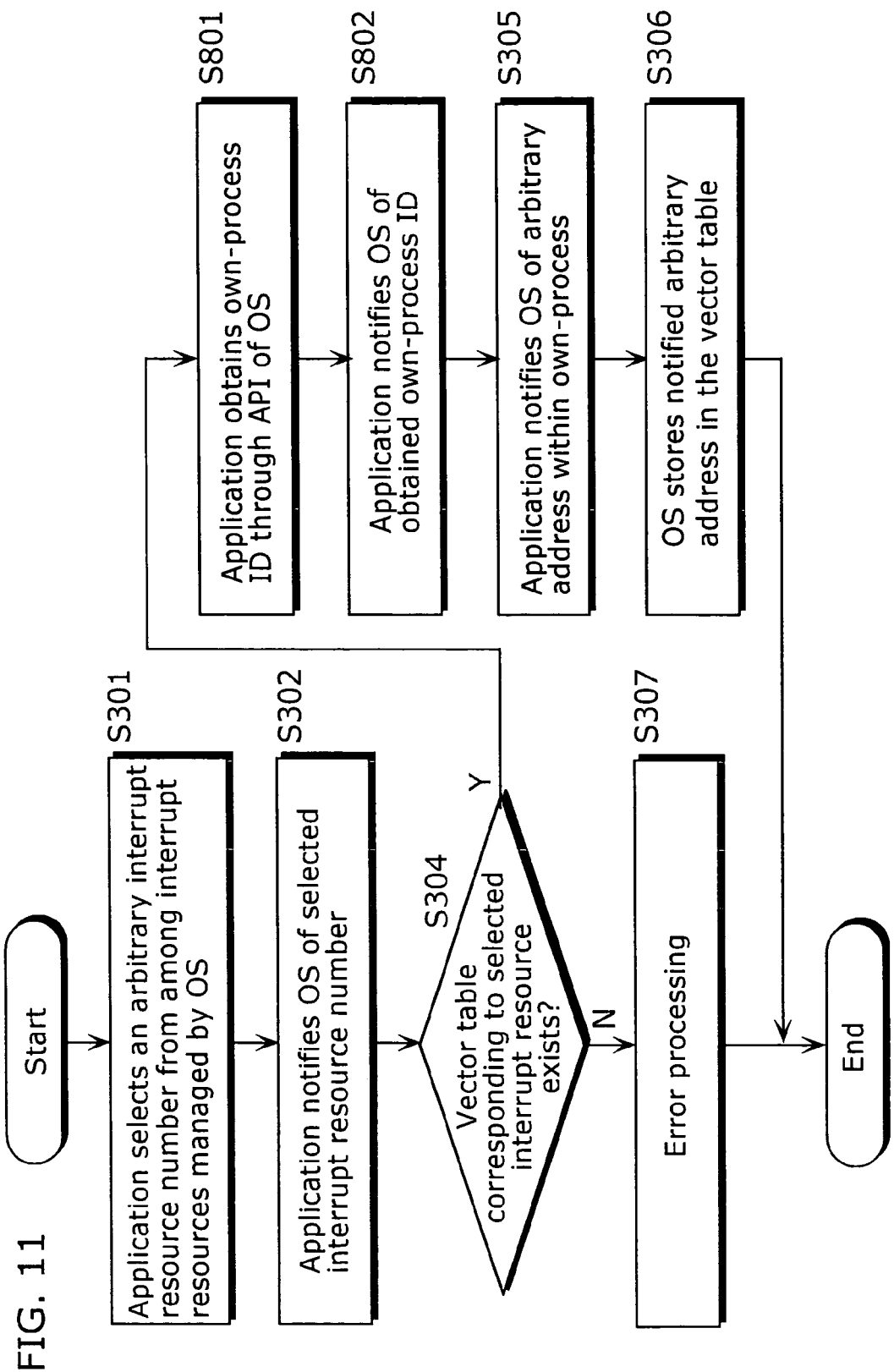
FIG. 11 is a flowchart showing the process for registering the extended interrupt entry function.

The flowchart shown in FIG. 11 shall be used to explain the process in which the interrupt entry function is registered by the application, in the interrupt control apparatus in FIG. 10. The flowchart in FIG. 11 shows the procedure for registering in the interrupt vector register within the CPU, the interrupt process routine (extended interrupt entry function) provided by the user, shown in FIG. 6, and the process ID notification procedure. Explanation shall be omitted for steps having numbers that are the same as in FIG. 6 as these indicate the same processes, and explanation shall be centered on the steps that are different.

In the case where the vector register corresponding to the notified resource number is present within the vector table (S304), the application obtains the process ID of its own-process from the OS through an API (Application Program Interface) (S801), and notifies the OS of the obtained process ID (S802). Upon receiving the notification, the OS stores the notified process ID and interrupt level within the TLB updating unit 117.

With this, the notification of the process ID, from the application to the OS, and the storage of the process ID in the TLB updating unit 117 within the OS are completed.

Figure 12:
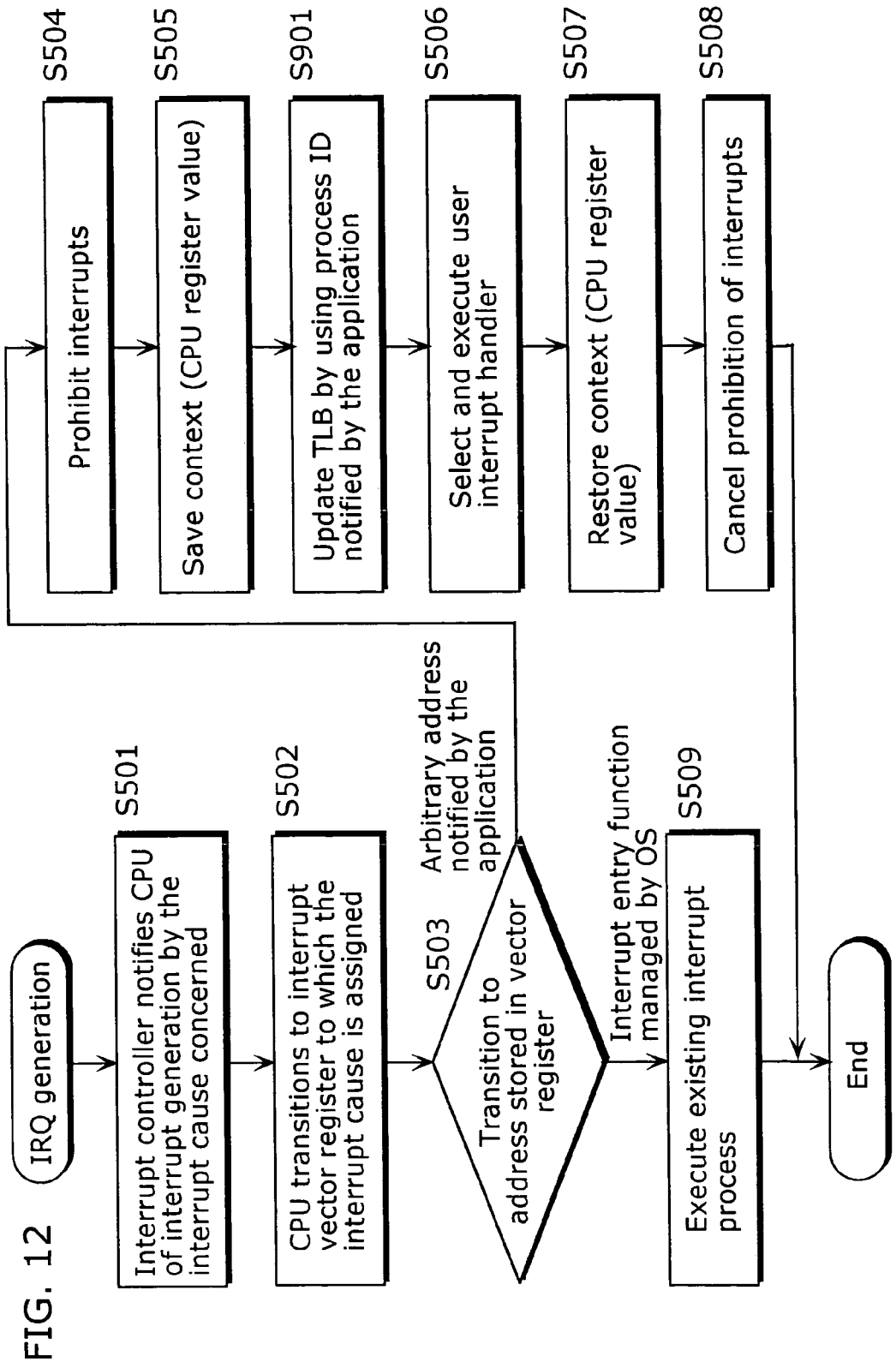
FIG. 12 is a flowchart showing the interrupt control process.

Next, FIG. 12 is a flowchart showing the interrupt control process in the case where an interrupt is actually generated after the storing process in FIG. 11. Compared with the interrupt control process in FIG. 8, FIG. 12 is different in having a step S901 added in between the steps S505 and S506. Explanation shall be omitted for the steps with the same number as in FIG. 6 as these indicate the same processes, and explanation shall be centered on the points of difference.

After the context is saved (S505) in the execution of the extended interrupt entry function, the TLB updating unit 117 is instructed to update the TLB. Upon receiving this instruction, the TLB updating unit 117 reads, from the page table, the page data of the notified process ID, and stores this in the TLB 116 (S901). In this manner, by updating the TLB 116 based on the process ID, the user process space address can be referenced.

In the manner mentioned above, the interrupt process function corresponding to the second type interrupt managed by the application can be implemented in the user process space of the application, which is different from the kernel space.

Furthermore, although after the generation of an interrupt, transition is made from the extended interrupt entry process (kernel space) to the interrupt process function managed by the application (user process space), interrupt responsiveness is not inhibited as the scheduler 106 within the kernel is bypassed.

Moreover, the present invention is not limited to the previously described embodiments, and can be carried out in various modifications within the scope of the general description.

The present invention is suitable as an interrupt control apparatus for controlling interrupts generated from interrupt resources, as a part of an OS which controls a computer system. In particular, the present invention is suitable as an interrupt control apparatus, an interrupt control method, and program, for managing the respective interrupts of interrupt resources in a computer system, separately for the OS and the application.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. An interrupt control apparatus for controlling interrupts generated from interrupt resources, as a part of an operating system controlling a computer system, said interrupt control apparatus comprising:
   a receiving unit operable to receive a notification according to an execution of an application program, in which the notification includes interrupt resource information and address information which corresponds to the interrupt resource;
   a table unit operable to receive, from said receiving unit, and hold the address information which corresponds to interrupt resources of a first type being interrupt resources which are managed by the operating system, and operable to receive, from said receiving unit, and hold the address information which corresponds to interrupt resources of a second type being interrupts resources which are not managed by the operating system; and
   a launching unit operable to receive the address information held in said table unit, and operable to launch the following according to the address information held in said table unit:
      a first control process, which includes a management process common to the interrupt resources of the first type, for an interrupt generated by an interrupt resource of the first type; and
      a second control process, which does not include the management process, for an interrupt generated by an interrupt resource of the second type.

2. The interrupt control apparatus according to claim 1, wherein, upon the launch of the second control process, said launching unit is operable to sequentially execute:
   a saving of a context;
   an interrupt process when the interrupt generated is generated from an interrupt resource of the second type; and
   a restoring of the saved context.

3. The interrupt control apparatus according to claim 2, wherein, upon the launch of the second control process, said launching unit is operable to prohibit a receiving of the interrupts generated from interrupt resources prior to the execution of the saving of the context, and operable to cancel the prohibition of the receiving of interrupts generated from interrupt resources by the time the second control process is completed.

4. The interrupt control apparatus according to claim 2 further comprising:
   a conversion buffer operable to store a page data, which corresponds to a currently launched process, from a page table in a virtual memory; and
   an updating unit operable, upon the launch of the second control process, to update said conversion buffer prior to the execution of the interrupt process so as to store the page data corresponding to the interrupt process.

5. The interrupt control apparatus according to claim 4, wherein
   said receiving unit is operable to receive a notification according to the execution of the application program, in which the notification includes a process ID corresponding to the interrupt generated by the interrupt resource of the second type, and said updating unit is operable to read the page data from the page table according to the process ID included in the notification received by said receiving unit, and operable to store the page data in the conversion buffer.

6. An interrupt control apparatus for controlling interrupts generated from interrupt resources, as a part of an operating system controlling a computer system, said interrupt control apparatus comprising:

a table unit operable to receive and hold address information which corresponds to interrupt resources of a first type being interrupt resources which are managed by the operating system, and operable to receive and hold address information which corresponds to interrupt resources of a second type being interrupt resources which are not managed by the operating system; and a launching unit operable to receive the address information held in said table unit, and operable to launch the following according to the address information held in said table unit:

a first control process, which includes a management process common to the interrupt resources of the first type, for an interrupt generated by an interrupt resource of the first type; and a second control process, which does not include the management process, for an interrupt generated by an interrupt resource of the second type, wherein said table unit is operable to hold, for each interrupt resource, an interrupt level which indicates a priority of the interrupt resource, and a classification which indicates whether each interrupt resource is either an interrupt resource of the first type or an interrupt resource of the second type, wherein said launching unit is operable to determine the interrupt level of each interrupt resource and operable to determine whether the interrupt generated is of the first type or the second type according to the classification held in said table unit, and said launching unit is operable to launch either the first control process or the second control process according to the determination of whether the interrupt generated is of the first type or the second type.

7. The interrupt control apparatus according to claim 6, further comprising a receiving unit operable to receive a notification according to an execution of an application program, in which the notification includes interrupt resource information and address information which corresponds to the interrupt resource, wherein said table unit is operable to receive from said receiving unit the address information which corresponds to an interrupt resource of the second type according to the notification received by said receiving unit according to the execution of the application program.

8. The interrupt control apparatus according to claim 7, wherein, upon the launch of the second control process, said launching unit is operable to sequentially execute:

a saving of a context;

an interrupt process when the interrupt generated is generated from an interrupt resource of the second type; and a restoring of the saved context.

9. The interrupt control apparatus according to claim 8, wherein, upon the launch of the second control process, said launching unit is operable to prohibit a receiving of the interrupts generated from interrupt resources prior to the execution of the saving of the context, and operable to cancel the prohibition of the receiving of interrupts generated from interrupt resources by the time the second control process is completed.

10. The interrupt control apparatus according to claim 8, further comprising:

a conversion buffer operable to store a page data, which corresponds to a currently launched process, from a page table in a virtual memory; and an updating unit operable, upon the launch of the second control process, to update said conversion buffer prior to the execution of the interrupt process so as to store the page data corresponding to the interrupt process.

11. The interrupt control apparatus according to claim 10, wherein said receiving unit is operable to receive a notification according to the execution of the application program, in which the notification includes a process ID corresponding to the interrupt generated by the interrupt resource of the second type, and said updating unit is operable to read the page data from the page table according to the process ID included in the notification received by said receiving unit, and operable to store the page data in the conversion buffer.

12. An interrupt control apparatus for controlling interrupts generated from interrupt resources, as a part of an operating system controlling a computer system, said interrupt control apparatus comprising:

a table unit operable to receive and hold address information which corresponds to interrupt resources of a first type being interrupt resources which are managed by the operating system and operable to receive and hold address information which corresponds to interrupt resources of a second type being interrupt resources which are not managed by the operating system; and a launching unit operable to receive the address information held in said table unit, and operable to launch the following according to the address information held in said table unit:

a first control process, which includes a management process common to the interrupt resources of the first type, for an interrupt generated by an interrupt resource of the first type; and a second control process, which does not include the management process, for an interrupt generated by an interrupt resource of the second type, wherein said launching unit is operable to determine whether the interrupt generated is of the first type or the second type by comparing an interrupt level of the interrupt generated with a predetermined level.

13. The interrupt control apparatus according to claim 12, further comprising a receiving unit operable to receive a notification according to an execution of an application program, in which the notification includes interrupt resource information and address information which corresponds to the interrupt resource, wherein said table unit is operable to receive from said receiving unit the address information which corresponds to an interrupt resource of the second type according to the notification received by said receiving unit according to the execution of the application program.

14. The interrupt control apparatus according to claim 13, wherein upon the launch of the second control process, said launching unit is operable to sequentially execute:

a saving of a context;

an interrupt process when the interrupt generated is generated from an interrupt resource of the second type; and a restoring of the saved context.

15. The interrupt control apparatus according to claim 14, wherein upon the launch of the second control process, said launching unit is operable to prohibit a receiving of the interrupts generated from interrupt resources prior to the execution of the saving of the context, and operable to cancel the prohibition of the receiving of interrupts generated from interrupt resources by the time the second control process is completed.

16. The interrupt control apparatus according to claim 14, further comprising:
a conversion buffer operable to store a page data, which corresponds to a currently launched process, from a page table in a virtual memory; and
an updating unit operable, upon the launch of the second control process, to update said conversion buffer prior to the execution of the interrupt process so as to store the page data corresponding to the interrupt process.

17. The interrupt control apparatus according to claim 16, wherein
said receiving unit is operable to receive a notification according to the execution of the application program, in which the notification includes a process ID corresponding to the interrupt generated by the interrupt resource of the second type, and
said updating unit is operable to read the page data from the page table according to the process ID included in the notification received by said receiving unit, and operable to store the page data in the conversion buffer.

18. An interrupt control method for controlling interrupts generated from interrupt resources, as a part of an operating system controlling a computer system, said interrupt control method comprising:
receiving a notification according to an execution of an application program, in which the notification includes interrupt resource information and address information which corresponds to the interrupt resource;
adding, according to the notification received by said receiving of a notification, the address information which corresponds to interrupt resources of a second type, being interrupt resources which are not managed by the operating system, into a management table holding address information which corresponds to interrupt resources of a first type being interrupt resources which are managed by the operating system; and
launching, based on the address information held in the management table, a first control process, which includes a management process common to the interrupt resources of the first type, for an interrupt generated by an interrupt resource of the first type, and a second control process, which does not include the management process, for an interrupt generated by an interrupt resource of the second type.

19. A computer-readable recording medium which stores a program for controlling interrupts generated from interrupt resources, as a part of an operating system controlling a computer system, the program for controlling the interrupts generated from the interrupt resources causing the computer system to execute a method comprising:
receiving a notification according to an execution of an application program, in which the notification includes interrupt resource information and address information which corresponds to the interrupt resource;
adding, according to the notification received by said receiving of a notification, the address information which corresponds to interrupt resources of a second type, being interrupt resources which are not managed by the operating system, into a management table holding address information which corresponds to interrupt resources of a first type being interrupt resources which are managed by the operating system; and
launching, based on the address information held in the management table, a first control process, which includes a management process common to the interrupt resources of the first type, for an interrupt generated by an interrupt resource of the first type, and a second control process, which does not include the management process, for an interrupt generated by an interrupt resource of the second type.

20. An interrupt control apparatus for controlling interrupts generated from interrupt resources, as a part of an operating system controlling a computer system, said interrupt control apparatus comprising:
a receiving unit operable to receive a notification according to an execution of an application program, in which the notification includes interrupt resource information and address information which corresponds to the interrupt resource;
a table unit operable to receive, from said receiving unit, and hold the address information which corresponds to interrupt resources of a first type being interrupt resources which are managed by the operating system and operable to receive, from said receiving unit, and hold the address information which corresponds to interrupt resources of a second type being interrupt resources which are not managed by the operating system; and a launching unit operable to receive the address information held in said table unit, and operable to launch:
a first control process, which includes a management process common to the interrupt resources of the first type, for an interrupt generated by an interrupt resource of the first type, by calling a first interrupt entry function according to the address information held in said table unit and executing the first interrupt entry function; and a second control process, which does not include the management process, for an interrupt generated by an interrupt resource of the second type, by calling a second interrupt entry function according to the address information held in said table unit and executing the second interrupt entry function.

21. The interrupt control apparatus according to claim 20, wherein the management process includes reconciliation with respect to other interrupts, as well as schedule adjustment with respect to other processes,
the first interrupt entry function includes classification of a cause of the interrupt generated, calling the first control process,
the first control process includes calling the management process, and calling an interrupt handler corresponding to the classification of the cause of the interrupt generated,
the second interrupt entry function includes classification of a cause of the interrupt generated, and calling the second control process, and
the second control process includes calling an interrupt handler corresponding to the classification of the cause of the interrupt generated.

* * * * *